F. SCHEURER
COUNTER SCALE.
No. 13,232. Patented July 10, 1855.
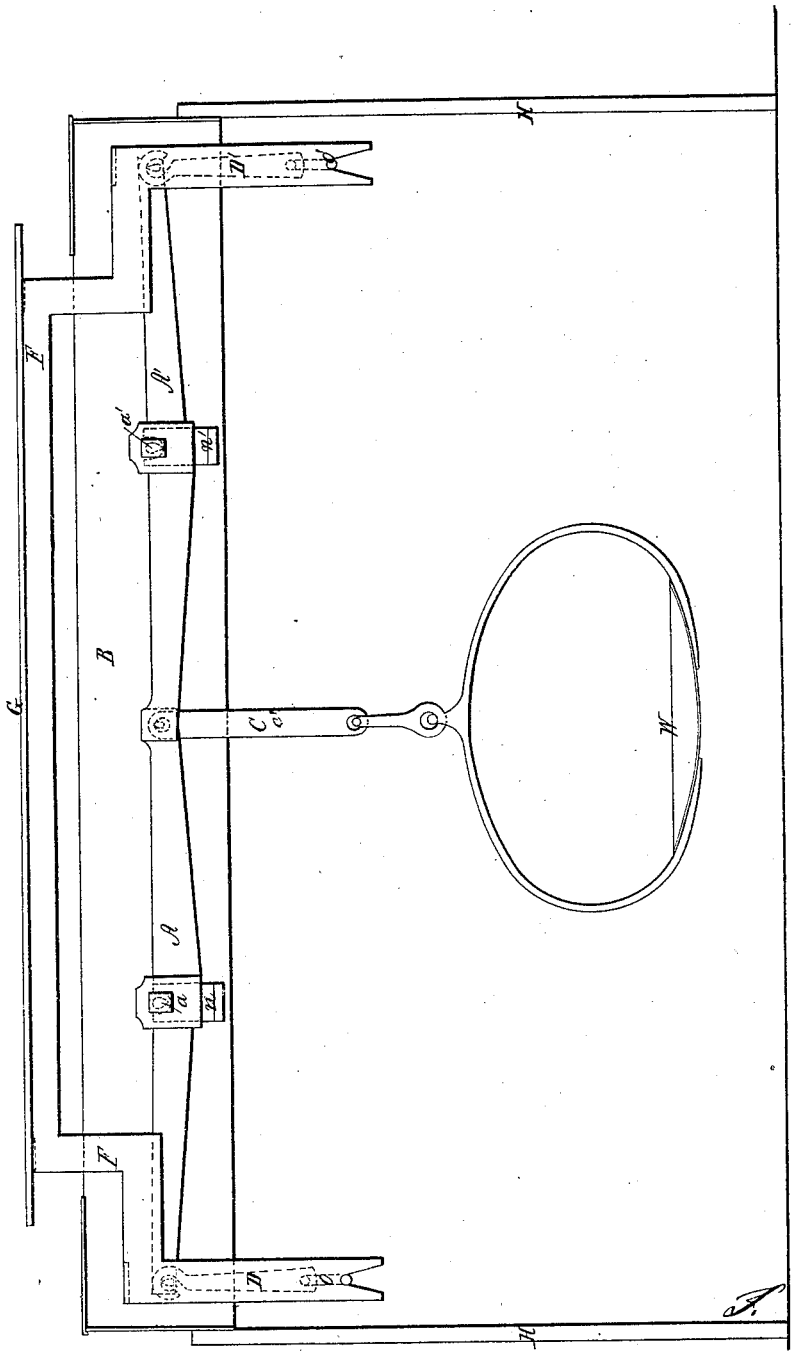
Inventor,
F. Scheurer

UNITED STATES PATENT OFFICE.

FREDERICK SCHEURER, OF NEW YORK, N. Y.

COUNTER-SCALE.

Specification of Letters Patent No. 13,232, dated July 10, 1855.

*To all whom it may concern:*

Be it known that I, FRED. SCHEURER, of New York, in the county and State of New York, have invented a new and Improved Counter-Scale; and I do hereby declare that the following is a full and exact description thereof, reference being had to the accompanying drawing, and to the letters of reference marked thereon, which represents a front view of the scale with part of the frame removed.

The nature of my invention consists in the combination of two scale beams, whose outer arms are connected together by a frame which carries the scale upon which the goods to be weighed are placed and whose inner arms are connected together through links with the scale to receive the weight, said scales for receiving the goods and the weight to be situated directly one above the other.

A, A' are two scale beams resting with their axes $a$, $a'$ in suitable bearings $n$, $n'$ fast to the frame B.

C, C' are two links, one of which is attached to the inner arm of the scale beam A and the other to the inner arm of the scale beam A'. To the lower end of those links the scale W to receive the weight is attached.

D and D' are links connected to the outer arms of the scale beams A and A' respectively and O and O' are links attached again to said links D, D' with their ends projecting outward to receive the ends of the frame F.

F is a frame resting with its legs upon the links O, O' as above mentioned and connecting thereby the outer arms of the scale beams A and A' together. This frame carries the scale G, to place the goods on, which are to be weighed, and is so constructed as to allow sufficient play for the inner arms of the scale beams without striking said scale.

H are the feet of the frame B.

The advantage of my invention consists in obtaining a flat or straight scale to be able to lay long goods upon and having at the same time the scale for the weights directly underneath the same, thereby making this counterscale more convenient for all kinds of goods and more sensitive than any others at present made.

What I claim as my invention and desire to secure by Letters Patent is—

The combination of two common beam scales, with their inner arms connected together by links, to which the scale to receive the weights is attached, and their outer arms being connected by a frame to carry a flat or straight scale to place the goods on, which are to be weighed, the whole being constructed in the manner and for the purpose substantially as described.

F. SCHEURER.

Signed in presence of witnesses:
HENRY E. RAEDER,
J. B. BRAYDON.